United States Patent [19]

Jensen

[11] 4,272,492

[45] Jun. 9, 1981

[54] SELECTIVE EXTRACTION AND RECOVERY OF COPPER

[76] Inventor: Wayne H. Jensen, 1102 E. 10th, Casa Grande, Ariz. 85222

[21] Appl. No.: 44,080

[22] Filed: May 31, 1979

[51] Int. Cl.³ .............................................. C01G 3/10
[52] U.S. Cl. ...................................... 423/24; 204/106; 204/107; 156/642; 156/666
[58] Field of Search ................. 423/24, 499, DIG. 14; 75/101 BE, 117; 204/106–108; 156/642

[56] References Cited

U.S. PATENT DOCUMENTS

| | | | |
|---|---|---|---|
| 3,082,062 | 3/1963 | Preass | 423/139 |
| 3,224,873 | 12/1965 | Swanson | 75/101 BE |
| 3,428,449 | 2/1969 | Swanson | 423/24 |
| 3,440,036 | 4/1969 | Spinney | 75/117 |
| 3,507,645 | 4/1970 | Spitzer | 423/24 |
| 3,532,568 | 10/1970 | Kovell | 156/642 |
| 3,558,288 | 1/1971 | Burrows | 75/117 |
| 3,664,815 | 5/1972 | Wigstol | 423/24 |
| 3,676,106 | 7/1972 | Hazen | 75/101 R |
| 3,761,249 | 9/1973 | Ritcey | 75/101 BE |
| 3,772,105 | 11/1973 | Shipley | 156/642 |
| 3,824,161 | 7/1974 | Aue | 75/101 BE |
| 3,849,269 | 11/1974 | Hartwig | 204/107 |
| 3,853,981 | 12/1974 | Hadzeriga | 423/24 |
| 3,855,090 | 12/1974 | Skarbo | 423/24 |
| 3,872,209 | 3/1975 | Hazen | 423/24 |
| 3,887,679 | 6/1975 | Wigstol | 423/24 |
| 3,907,966 | 9/1975 | Skarbo | 423/139 |
| 3,923,615 | 12/1975 | Kane | 423/24 |
| 3,927,169 | 12/1975 | Goren | 423/24 |
| 3,950,487 | 4/1976 | Pemsler | 423/24 |
| 3,971,652 | 7/1976 | Bryson | 423/24 |
| 3,981,966 | 9/1976 | Baucom | 423/24 |
| 3,988,151 | 10/1976 | Skarbo | 423/24 |
| 4,023,964 | 5/1977 | DeMarthe | 423/24 |
| 4,036,639 | 7/1977 | Yurko | 423/24 |
| 4,069,119 | 1/1978 | Wong | 423/24 |
| 4,083,758 | 4/1978 | Hamby | 423/24 |
| 4,123,260 | 10/1978 | Sefton | 75/117 |
| 4,175,012 | 11/1979 | MacKay | 423/24 |

FOREIGN PATENT DOCUMENTS 2615287 10/1977 Fed. Rep. of Germany ............. 423/24

OTHER PUBLICATIONS

Marcus, *Ion Exchange and Solvent Extraction of Metal Complexes,* Wiley Interscience, NY, 1969, pp. 499–509, 518, 519, 694, 695, 705, 737–739, 787–791, 794–797, 954–956, 958–960.

Spitzer, "The Use of Organic Chemicals for the Selective Liquid/Liquid Extraction of Metals", *Ingeniursblad,* vol. 41, 1972, pp. 418–423.

Olsen, "Solvent Extraction of Chlorocomplexes by Triisooctylamine/Carbon Tetrachloride from Hydrochloric Acid Medium", *Acta Chemica Scandinavica* 20 (1966) pp. 1621–1625.

Habashi, *Extractive Metallurgy,* vol. II, Gordon and Breach, N.Y., 1970, pp. 175, 176.

*Primary Examiner*—Brian E. Hearn
*Attorney, Agent, or Firm*—Burton & Dorr

[57] ABSTRACT

A process for selectively extracting and ultimately recovering copper from acidic chloride solutions containing the same wherein an acidic chloride solution containing copper is initially contacted with an extractant to selectively extract copper, as copper chloride, therefrom. The loaded extractant is contacted with a suitable aqueous stripping solution to strip copper therefrom. Thereafter, the pregnant aqueous stripping solution is contacted with an active hydrogen ion exchange extractant, such as hydroxy oxime, a beta diketone or mixture thereof dissolved in an inert organic carrier solvent. The active hydrogen ion exchange extractant selectively extracts copper from the pregnant aqueous stripping solution with hydrochloric acid being formed. An aqueous acidic stripping solution is utilized to strip copper from the loaded hydrogen ion exchange extractant, the copper being recoverable from the pregnant aqueous acidic stripping solution as cathode copper by electrowinning and/or copper sulfate by crystallization. The hydrochloric acid formed during extraction of copper by the hydrogen ion exchange extractant is preferably neutralized to provide predetermined pH by the addition of a suitable base to efficiently and effectively utilize the hydrogen ion exchange extractant without any localized precipitation of copper.

62 Claims, 7 Drawing Figures

SELECTIVE EXTRACTION AND RECOVERY OF COPPER

BACKGROUND OF THE INVENTION

1. Field of the Invention

The present invention relates to a process for the selective extraction and ultimate recovery of copper from an acidic chloride solution containing copper, and more particularly to a process for selectively extracting and ultimately recovering copper from both a spent cupric chloride etch and a spent ammoniacal etch, both of which are derived from etching copper from printed circuit boards in the electronic industry.

2. Description of the Prior Art

Selective recovery of copper from solutions containing the same has become a major concern of the metals industry in recent years. Solvent extraction is one technique for recovering copper from solutions which has achieved increasing popularity and acceptance, in particular, liquid-liquid type solvent extraction. Liquid-liquid solvent extraction involves contacting a copper-containing, aqueous feed solution with an organic extractant. The organic extractant has an active organic extractant for selectively extracting copper dissolved in an inert organic solvent (carrier), such as kerosene. Hydroxy oximes, beta diketones and tertiary amines are examples of active, selective organic extractants. Multi-stage liquid-liquid extraction may be employed to achieve substantially complete extraction of copper from a solution containing copper. The copper-containing aqueous feed solution and the organic extractant flow countercurrently between the extraction stages. In each stage, the active organic extractant selectively extracts copper from the solution containing the same, resulting in a copper loaded organic phase and a raffinate from which copper has been removed. Each stage constitutes a mixer-settler system wherein the aqueous feed and organic extractant are mixed for a period of time and then permitted to settle so as to separate the phases. The copper from the loaded organic extractant is selectively stripped therefrom by contact with a suitable stripping solution.

Several patents relate to processes which involve, at least in part, the use of liquid-liquid extraction to selectively recover copper. Examples of such patents are U.S. Pat. No. 3,224,873 issued to Swanson on Dec. 21, 1965, U.S. Pat. No. 3,761,249 issued to Ritcey et al on Sept. 25, 1973, U.S. Pat. No. 3,849,269 issued to Hartwig et al on Nov. 19, 1974, U.S. Pat. No. 3,853,981 issued to Hadzeriga on Dec. 10, 1974, U.S. Pat. No. 3,855,090 issued to Skarbo on Dec. 17, 1974, U.S. Pat. No. 3,872,209 issued to Hazen et al on Mar. 18, 1975, U.S. Pat. No. 3,887,679 issued to Wegstol et al on June 3, 1975, U.S. Pat. No. 3,907,966 issued to Skarbo on Sept. 23, 1975, U.S. Pat. No. 3,927,169 issued to Goren et al on Dec. 16, 1975, U.S. Pat. No. 3,950,487 issued to Pemsler et al on Apr. 13, 1976, U.S. Pat. No. 3,971,652 issued to Bryson on July 27, 1976, U.S. Pat. No. 3,981,966 issued to Baucom on Sept. 21, 1976, U.S. Pat. No. 3,988,151 issued to Skarbo on Oct. 26, 1976, U.S. Pat. No. 4,023,964 issued to DeMarthe et al on May 17, 1977, U.S. Pat. No. 4,036,639 issued to Yarko on July 19, 1977 and German Pat. No. 26 15 287 issued to Perschke et al on Oct. 6, 1977.

As copper reserves dwindle under increased copper demand, and therefore exploitation, it has become imperative to recycle "waste" copper. One source of such "waste" copper is copper contained in spent etches derived from the etching of copper from printed electronic circuit boards. Conventionally, aqueous solutions of hydrochloric acid and sodium chlorate or aqueous solutions of ammonia and ammonium chloride are employed to etch copper from printed electronic circuit boards. The resultant spent etch solution contains relatively large quantities of copper in solution. Currently, these spent etch solutions are waste streams in the electronic industry, and in fact, many firms pay other concerns to properly dispose the spent etch solutions.

U.S. Pat. No. 3,440,036 issued to Spinney on Apr. 22, 1969 relates to a process for liquid-liquid ion exchange extraction of copper from a ammonium sulfate-ammonium peroxy-disulfate etch solution with hydroxy oximes as the extraction agent. The pH of the etch solution must range from about 5.5 to about 7.5 when utilizing a hydroxy oxime to effectively extract copper therefrom. U.S. Pat. No. 4,083,758 issued to Hamby et al on Apr. 1, 1978 discloses a process for recovering copper values from a solution containing such values along with chloride ions, particularly spent, ammoniacal etching solutions derived from the manufacture of printed electronic circuit boards. The process comprises removing copper from the solution utilizing conventional liquid-liquid extraction techniques employing a LIX reagent, organic extractants manufactured by Henkel Corporation, in an organic vehicle as the extractant. The copper values are thereafter stripped from the extractant by contacting the extractant with a strong sulfuric acid solution as conventionally known. An electrowinning circuit is provided to recover "wire-grade" metallic copper from the acidic stripping solution.

These processes do not provide for product selectivity from diverse copper-containing feed streams and, therefore, have limited marketability. Nor do these processes encompass a plurality of diverse feed streams which may be concurrently processed thereby. Thus, it can be appreciated that a need exists for an improved process for selectively extracting copper from solution(s) containing the same.

BRIEF SUMMARY OF THE INVENTION

The present invention relates to a process for selectively extracting and ultimately recovering copper from acidic chloride solutions containing copper, particularly a spent cupric chloride etch derived by etching copper from printed electronic circuit boards. The acidic chloride solution containing copper is initially contacted with an extractant to selectively extract copper, as copper chloride, therefrom. Subsequently, the acidic chloride solution is contacted with a hydrogen ion exchange extractant, such as a hydroxy oxime dissolved in kerosene, to selectively extract the remaining copper therefrom. The extraction utilizing the hydrogen ion exchange extractant is preferably pH controlled within a predetermined range by addition of a suitable basic neutralizing reagent so as to effectively and efficiently utilize the hydrogen ion exchange extractant without any localized precipitation of copper therefrom. The loaded extractant is contacted with a relatively neutral aqueous stripping solution to strip copper, as copper chloride, therefrom. The pregnant aqueous stripping solution is contacted with the hydrogen ion exchange extractant to selectively extract copper therefrom. As before, such extraction is preferably pH controlled by the addition of a suitable basic neutralizing agent. A spent ammoniacal etch derived by etching copper from printed electronic circuit boards may be contacted with the hydrogen ion exchange extractant, the extractant selectively extracting copper therefrom while ammonia is freed to function as the basic neutralizing agent. An aqueous acidic stripping solution is utilized to strip copper from the loaded hydrogen ion exchange extractant, saleable copper being recoverable from the resultant pregnant aqueous acidic stripping solution as cathode copper by electrowinning. Alternatively, the pregnant aqueous stripping solution containing copper, as copper chloride, may be contacted with a hydrogen ion exchange extractant, such as a beta diketone dissolved in kerosene, to selectively extract copper therefrom, the extraction being pH controlled as aforedescribed. A relative weak aqueous acidic stripping solution is utilized to strip copper from the loaded beta diketone extractant, saleable copper being recoverable from the resultant pregnant aqueous acidic stripping solution as copper sulfate by crystallization, or cathode copper by electrowinning. Mixtures of hydrogen ion exchange extractants may be employed to contact the pregnant aqueous stripping solution containing copper as copper chloride. Aqueous acidic stripping solutions of varying strengths are utilized to separately strip copper from each hydrogen ion exchange extractant employed, saleable copper being recovered from the resultant pregnant stripping solutions as cathode copper and/or copper sulfate.

BRIEF DESCRIPTION OF THE DRAWINGS

The invention will be more readily understood by reference to the accompanying drawings wherein like reference numerals are utilized to indicate like elements throughout the drawing figures in which.

DETAILED DESCRIPTION

Figure 1:
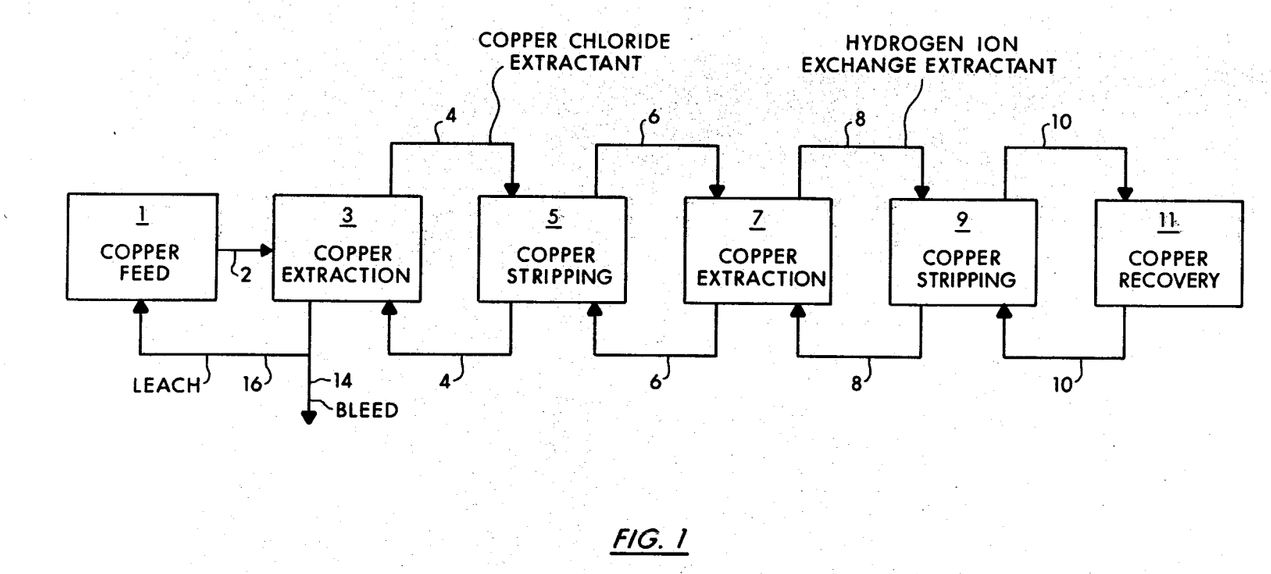
FIG. 1 is a schematic flow diagram of the process of the present invention.

Referring to FIG. 1, a schematic of a general embodiment of the process of the present invention is illustrated. A copper feed 1 which may be any acidic chloride solution containing copper irrespective of the origin thereof, such as, for example, obtained by leaching copper ores, concentrates, scraps and any other sources of copper or by etching copper as performed in various industries, is transported via a suitable conduit 2 to a first copper extraction unit 3. As utilized herein, the term "copper chloride" is meant to include both cupric chloride and cuprous chloride. Reactions hereinafter set forth which involve copper chloride will be written in terms of cupric chloride, the reactions involving cuprous chloride being evident therefrom to the skilled artisan. The extractant has an active extractant constituent which is dissolved in a suitable inert carrier solvent including aliphatic and aromatic solvents, such as, for example, kereosene, naphthols, fuel oil, benzene, toluene and xylene. The active extractant employed may be any active extractant which will selectively extract copper as copper chloride from the acidic chloride feed, such as, for example, an organophosphoric compound characterized by the general formula $(RO)_3P=O$ and a tertiary amine extractant characterized by the following general formula:

wherein $R_1$, $R_2$, and $R_3$ are straight or branched aliphatic chains containing from 6 to 18 carbon atoms. Preferrably a tertiary amine extractant is employed as the active extractant. The extractant selectively extracts copper as copper chloride from the copper feed in the first copper extraction stage 3. The first extraction unit has at least one extraction stage which may be comprised of any conventional apparatus for effective extraction, such as a mixer-settler device for liquid-liquid extraction having separate mixing and settling compartments. The aqueous feed and the extractant are emulsified by mixing in one compartment to enhance extraction, and the resulting emulsion is transported to a separate compartment where the emulsion separates upon settling into discrete phases. The number of extraction stages can be varied to achieve the degree of selective extraction of copper desired. Where a plurality of extraction stages are utilized, (i.e., multi-stage extraction), the aqueous feed and the extractant flow countercurrently between stages to increase copper recovery.

The loaded extractant (i.e., copper containing extractant) is transported via closed loop conduit 4 to a first copper stripping unit 5 wherein the loaded extractant is contacted with a suitable aqueous stripping solution transported via conduit 6. The stripping solution selectively strips copper as copper chloride from the loaded extractant. The stripped extractant is recycled via conduit 4 to copper extraction unit 3 to selectively extract copper from copper feed 1 which is continuously introduced into extraction unit 3. The pregnant stripping solution containing copper as copper chloride is transported via closed loop conduit 6 to a second copper extraction stage 7. In copper extraction stage 7, the pregnant copper stripping solution is contacted with a hydrogen ion exchange extractant transported to stage 7 via closed loop conduit 8. The extractant selectively extracts copper from the pregnant aqueous stripping solution by hydrogen ion exchange in accordance with the following general reaction (1):

$$CuCl_2 + 2RH \rightarrow R_2Cu + 2HCl \qquad (1)$$

Per reaction (1), hydrochloric acid is formed as copper is extracted by the organic extractant. This hydrochloric acid may be neutralized by the addition of a suitable basic material, such as, for example, ammonia, thereby forming ammonium chloride. Such neutralization permits a greater amount of copper to be loaded by the organic extractant, as hereinafter described. However, such neutralization and increased hydrogen ion exchange extractant loading may be unnecessary in certain processes, and therefore, the recycled stripping solution will be of increased acidity. The second copper extraction unit 7 has at least one extraction stage, as previously described with respect to first copper extraction unit 3. The hydrogen ion exchange extractant has an active organic extractant constitutent which is dissolved in an inert organic solvent constituent including aliphatic and aromatic solvents such as, for example, kerosene, napthols, fuel oil, benzene, toluene and xylene. The active organic extractant employed may be any active organic extractant which will selectively extract copper from the pregnant stripping solution by hydrogen ion exchange in accordance with general reaction (1), such as, for example, any commercially available hydroxy oxime, beta diketone or mixtures thereof.

The resultant spent stripping solution from which copper has been selectively extracted in extraction unit 7 is transported via closed loop conduit 6 to copper stripping stage 5 to selectively strip copper from the loaded extractant continuously introduced into stage 5. If hydrochloric acid formed during extraction has been neutralized, it is preferred to draw a bleed stream off the recycled spent stripping solution (not illustrated) to prevent excessive buildup, and therefore precipitation, of ammonium chloride.

The loaded hydrogen ion exchange extractant is transported via closed loop conduit 8 to a second copper stripping stage 9 wherein the loaded extractant is contacted with an aqueous, acidic stripping solution, for example, an aqueous sulfuric acid solution, transported via closed loop conduit 10. The aqueous acidic stripping solution selectively strips copper from the loaded hydrogen ion exchange extractant in accordance with the following general reaction (2):

$$H_2SO_4 + R_2Cu \rightarrow 2RH + CuSO_4 \quad (2)$$

The strength of the aqueous, acidic stripping solution will be dependent on the actual hydrogen ion exchange extractant employed. For example, if a hydroxy oxime is utilized, a relatively strong, concentrated acidic solution will effectively strip the loaded extractant. Where a beta diketone is employed as the hydrogen ion exchange extractant, a relatively weakly acidic solution will effectively strip copper therefrom. The resultant stripped hydrogen ion exchange extractant is recycled via conduit 8 to the second copper extraction stage 7 to selectively extract copper. The pregnant stripping solution is transported via conduit 10 to a suitable copper recovery unit 11, such as a copper electrowinning unit or copper sulfate crystallization unit. In addition, any conventional technique to recover any copper salt compound or copper containing compound may be utilized in copper recovery unit 11. The spent aqueous acidic stripping solution is transported via conduit 10 to the second copper stripping stage 9.

It should be noted that the copper feed 1 from which copper chloride is selectively extracted in copper extraction unit 3 may be recycled via conduit 16 and utilized as an acidic leach solution to leach copper from ores, concentrates, scrap, etc., thereby reducing operating costs of such a process. It should be noted that when the acid formed by extracting copper from the pregnant aqueous acidic stripping solution with the hydrogen ion exchange extractant is not neutralized, this acid is transferred to the extractant utilized in stage 3 and hence to the recycled feed achieving equilibrium between these solutions and thereby increasing the acidity and leaching capabilities of the recycled feed. It is preferred to draw a bleed stream off this recycled solution via conduit 14 to remove any undesirable contaminants and/or to prevent precipitation of any solution constituent due to a concentration increase over the solubility limit thereof.

Figure 4:
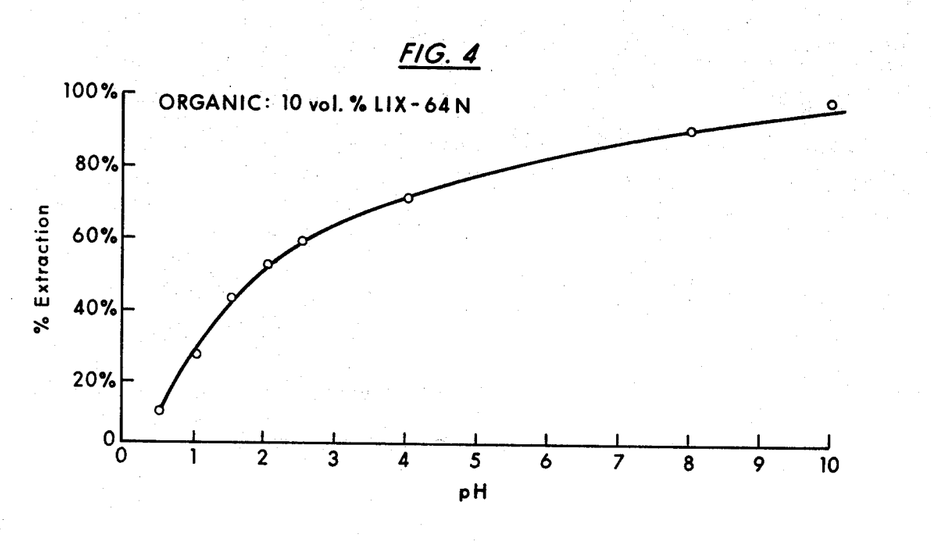
FIG. 4 is a graph illustrating the maximum loading of copper on a specific active hydrogen ion exchange extractant as a function of pH.
Figure 6:
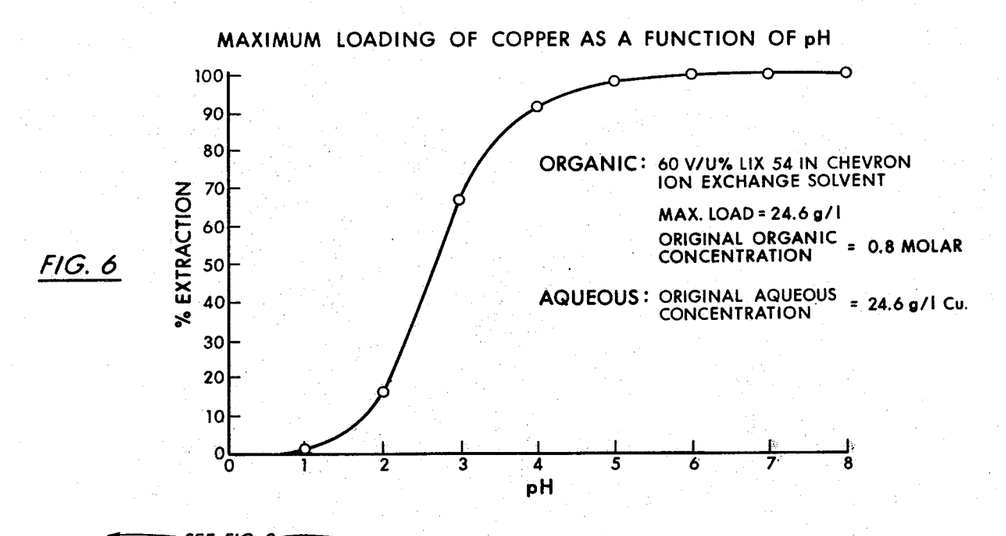
FIG. 6 is a graph illustrating the maximum loading of copper on a specific active hydrogen ion exchange extractant as a function of pH.

If the copper feed was directly transported to the copper extraction stage 7 and contacted therein with a hydrogen ion exchange extractant, a relatively large quantity of acid would be formed in accordance with general reaction (1), resulting in an extremely low pH, and therefore, poor copper recovery (as illustrated in FIGS. 4 and 6, hereinafter discussed). In addition, the extremely low pH would cause structural degradation of the hydrogen ion exchange extractant(s) employed resulting in increased costs for efficient copper recovery. If the acid generated by such extraction was neutralized to provide for more efficient copper recovery from the copper feed, a very small amount of the acid will be available for recycle to leach copper from ores, concentrates, scrap, etc. and the compound formed by neutralizing the acid, for example sodium chloride or ammonium chloride, will serve to contaminate the recycled leach solution thereby reducing the efficiency thereof. Alternatively, if the copper extraction stage 7 and the attendant stripping stage 9 were not utilized, a copper chloride containing solution would be transported to copper recover unit 11 providing only for the recovery of copper chloride. In contrast, the continuous process illustrated in FIG. 1 substantially prevents cross contamination of process streams and structural degradation of any extractants utilized therein in addition to providing product diversity, e.g., cathode copper and/or copper sulfate crystals.

Figure 2:
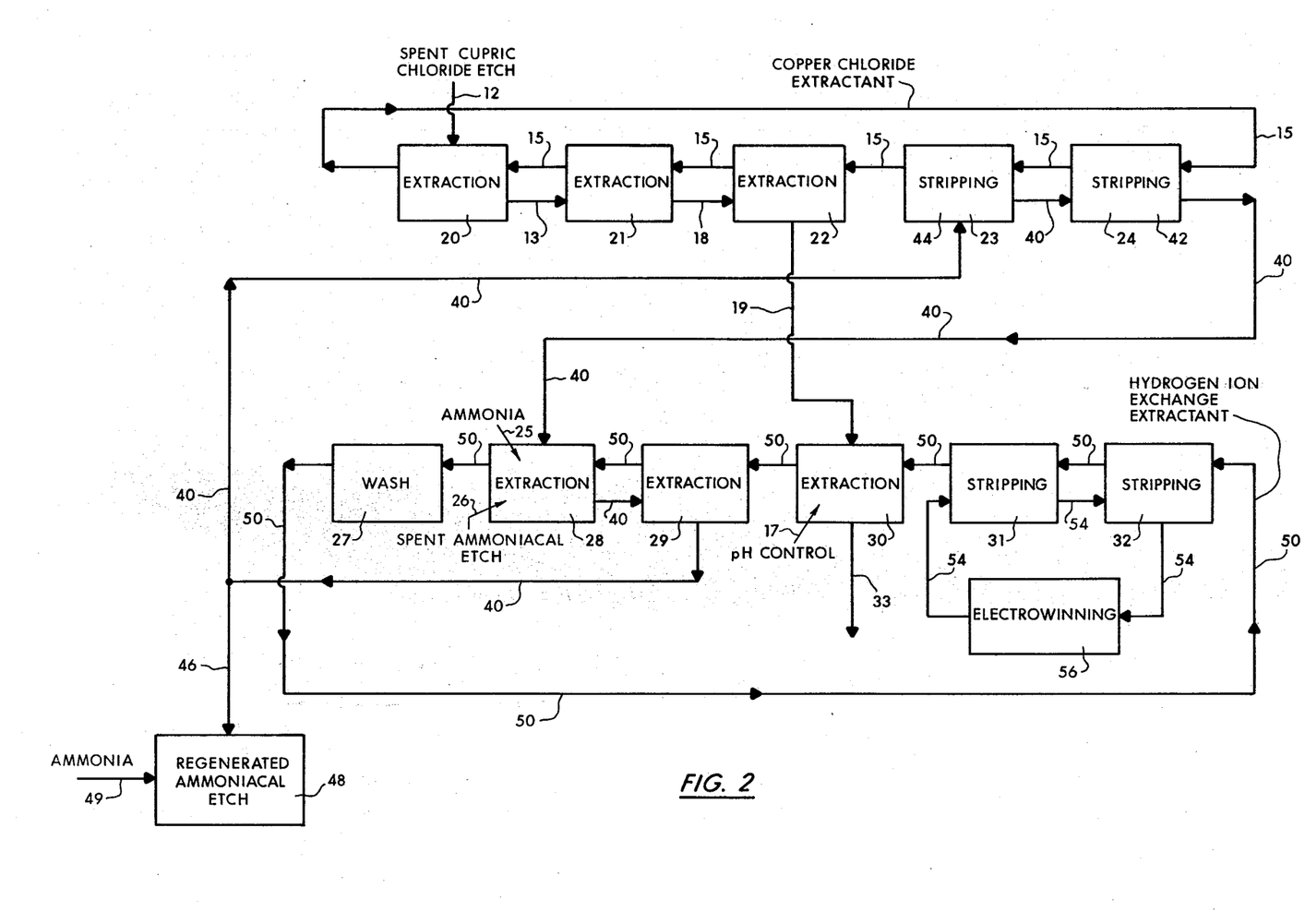
FIG. 2 is a schematic flow diagram of the preferred embodiment of the process of the present invention.

Turning now to FIG. 2, a process schematic of the preferred embodiment of the present invention is illustrated. A feed stream, a spent cupric chloride etch, is continuously transported via conduit 12 to a first extraction stage 20 wherein the feed is contacted with an extractant countercurrently transported via closed loop conduit 15 to stage 20. The extractant selectively extracts copper as cupric chloride from the feed. The feed is then transported via conduit 13 to a second extraction stage 21 and via conduit 18 to a third extraction stage 22 wherein the feed is again contacted in each stage with a tertiary amine extractant countercurrently transported via closed loop conduit 15 which selectively extracts copper therefrom. The feed is then transported via conduit 19 to extraction stage 30 wherein the feed is contacted by a hydrogen ion exchange extractant conveyed by closed loop conduit 50 which further selectively extracts copper therefrom. The resultant aqueous raffinate stream from which substantially all of the copper has been removed is transported via conduit 33, for purposes hereinafter described.

The spent cupric chloride etch is derived by etching copper from printed circuit boards utilized in the electronic industry with a hydrochloric acid, sodium chlorate aqueous solution. The resultant spent etch solution will contain relatively large quantities of both sodium chloride and copper, as cupric chloride, and a relatively lesser amount of hydrochloric acid. For example, a spent cupric chloride etch solution may contain about 1 to about 2 pounds of copper per gallon of solution, about 1 to about 50 grams per liter of hydrochloric acid, and a total chloride concentration between about 200 to about 300 grams per liter. The spent cupric chloride etch solution will generally have a pH of one or less.

Figure 3:
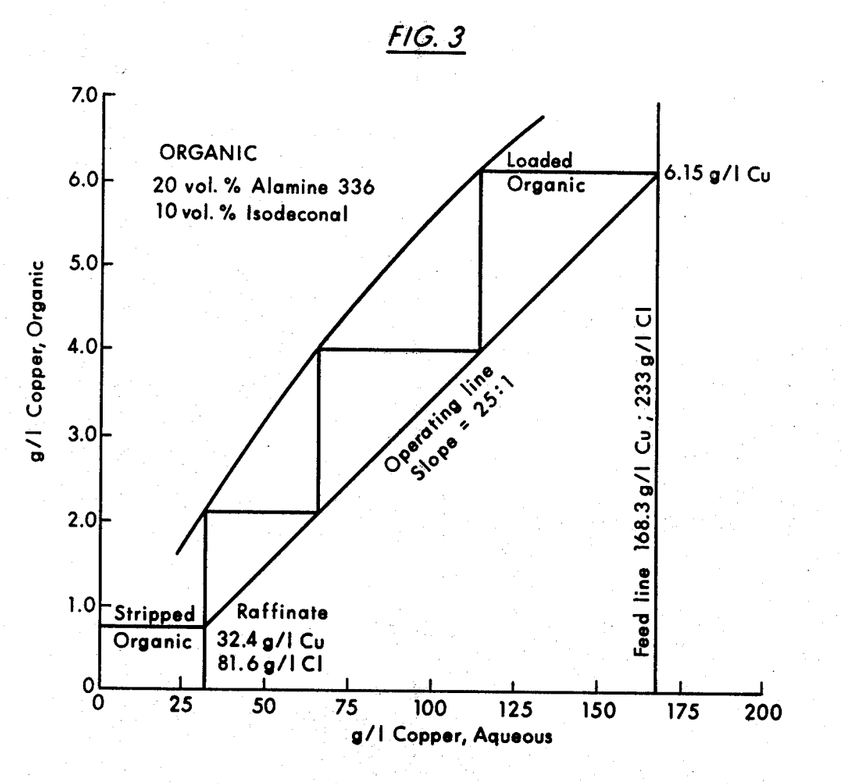
FIG. 3 is a McCabe-Thiele diagram for the extraction of copper from a spent cupric chloride etch utilizing a tertiary amine extractant.

As previously mentioned, the spent cupric chloride etch solution is countercurrently contacted in extraction stages 20, 21 and 22 with an extractant transported via closed loop conduit 15 which selectively extracts copper as cupric chloride from the etch solution. The extractant is dissolved in an inert organic carrier solvent, including aliphatic and aromatic solvents such as, for example, kerosene, naphthols, fuel oil, benzene, toluene and xylene. The active extractant employed may be any active extractant which will selectively extract copper as cupric chloride from the spent cupric chloride etch solution, such as, for example, an organophosphoric compound characterized by the general formula $(RO_3)P=O$ and a tertiary amine extractant characterized by the following general formula:

wherein $R_1$, $R_2$ and $R_3$ are straight or branched aliphatic chains containing from 6 to 18 atoms. Preferably, a tertiary amine is employed as the active extractant. The preferred tertiary amine to employ is ALAMINE 336, a $C_8-C_{10}$ substituted tertiary amine manufactured by Henkel Corporation, formerly General Mills Chemical, Inc. The exact mechanism by which the preferred extractant selectively extracts copper as cupric chloride from the feed stream is not fully understood. However, with reference to the McCabe-Thiele diagram illustrated in FIG. 3, approximately 30 to 40% of the total copper in the spent etch will be removed by the extractant in extraction stage 20, an additional approximately 30 to 35% of the total copper in the etch will be removed in extraction stage 21 and a still additional approximately 20 to 25% of the total copper in the etch will be removed in extraction stage 22. Thus, the cupric chloride etch transported via conduit 19 to extraction stage 30 will only contain approximately 0 to 20% of the total copper originally present in the feed solution.

The spent cupric chloride etch emanating from extraction stage 22 is transported via conduit 19 to extraction stage 30 wherein the spent etch is contacted with a hydrogen ion exchange extractant transported via closed loop conduit 50. The hydrogen ion exchange extractant has an active hydrogen ion exchange extractant constituent which is dissolved in an inert organic solvent constitutent including aliphatic and aromatic solvents such as, for example, kerosene, naphtols, fuel oil, benzene, toluene and xylene. The active hydrogen ion exchange extractant may be any such active hydrogen ion exchange extractant which will selectively extract copper from the spent cupric chloride etch by hydrogen ion exchange in accordance with the following general reaction (1), wherein R represents the active hydrogen ion exchange extractant:

$$CuCl_2 + 2RH \rightarrow R_2Cu + 2HCl \quad (1)$$

It is preferred to employ a hydroxy oxime, such as LIX 64N, a 2-hydroxy benzophenoxime, manufactured by the Henkel Corporation, as the active hydrogen ion exchange extractant. As hydrochloric acid is formed during the selective extraction of copper in accordance with general reaction (1), it is preferred to pH control the extraction stage so as to maintain the pH at a level where substantially all the copper can be recovered from the cupric chloride etch. As illustrated in FIG. 4, the active organic extractant can be loaded with only about 33% capacity of copper at a pH of about 1. Greater amounts of copper can be loaded in the active organic extractant at higher pH values, but at some pH value, for example, a pH of about or above 4, copper present in the aqueous phase will begin to precipitate out as copper hydroxide causing stable emulsions resulting in an inadequate phase separation, and therefore, copper recovery. Thus, it is important to maintain the pH in extraction stage 30 within a range such that the copper loading capability of the active hydrogen ion exchange extractant is effectively utilized without any attendant localized precipitation of copper as copper hydroxide. In view of this, it is preferred to maintain the pH in extraction stage 30 at a value of between about 3.0 and about 4.0 to effect this desired result. Ammonia or sodium carbonate may be introduced into extraction stage 30 to consume hydrochloric acid and maintain the pH as just described. Whether ammonia or sodium carbonate is added depends upon the end product desired and/or the economics involved. For example, it may be advantageous to recover sodium chloride from the raffinate transported from extraction stage 30 via conduit 33. In such instances, sodium carbonate is introduced into extration stage 30 via conduit 17 so as to consume hydrochloric acid and form, in part, sodium chloride in accordance with the following general reaction (3):

$$2HCl + Na_2CO_3 \rightarrow NaCl + H_2O + CO_2 \quad (3)$$

As will be evident to the skilled artisan, other basic neutralizing reagents, for example limestone, may be utilized in lieu of ammonia or sodium carbonate where dictated by economics, availability, and/or marketability. Extraction stage 30 is equipped with a pH controller to maintain the pH therein preferably between about 3.0 and about 4.0. When the pH in extraction stage 30 reaches a predetermined lower limit, ammonia or sodium carbonate is continuously added to extraction stage 30 via conduit 17. In this manner, the pH is maintained within the selected range to optimize copper extraction from the spent cupric chloride etch.

As such, raffinate transported via conduit 33 may be introduced into a suitable solar evaporation pond so as to recover sodium chloride therefrom. If recovery of sodium chloride from the raffinate emanating from extraction stage 30 is not desirable, ammonia or other more economically basic neutralization reagents may be utilized to pH control the extraction. As such, ammonia will consum hydrochloric acid in accordance with the following general reaction (4):

$$NH_3 + HCl \rightarrow NH_4Cl \quad (4)$$

In this embodiment, raffinate transported via conduit 33 will be disposed of in an environmentally acceptable manner.

The loaded extractant emanating from extraction stage 20 is transported via closed loop conduit 15 to stripping stages 42 and 44. A relatively neutral aqueous stripping solution (i.e., pH of approximately 4) is countercurrently transported to stripping stages 42 and 44 via closed loop conduit 40. In stripping stages 42 and 44, the loaded extractant containing copper as cupric chloride is contacted with the relatively neutral aqueous stripping solution to selectively strip copper from the extractant. The aqueous stripping solution is preferably an aqueous solution of ammonium chloride which is recycled within the process, as hereinafter described. Two stripping stages are illustrated as two are required to strip a substantial portion of the copper from the loaded extractant in this particular stripping circuit. Copper is stripped as cupric chloride together with some acid thereby lowering the pH of the netural stripping solution exiting stripping stage 42 to approximately 2. In this regard, it should be noted that the pH of the stripping solution entering stripping stage 44 and transported to stripping stage 42 is preferably maintained relatively neutral (i.e., pH of approximately 4) to effectively and efficiently strip copper from the loaded extractant.

The pregnant stripping solution emanating from stripping stage 42 is transported via closed loop conduit 40 to extraction stages 28 and 29 respectively wherein the pregnant stripping solution containing copper as cupric chloride is contacted with a hydrogen ion exchange extractant countercurrently transported to extraction stages 28 and 29 via closed loop conduit 50. The active hydrogen ion exchange extractant selectively extracts copper from the prenant stripping solution by hydrogen ion exchange in accordance with the following general reaction (1) wherein R represents the active hydrogen ion exchange extractant:

$$CuCl_2 + 2RH \rightarrow R_2Cu + 2HCl \quad (1)$$

As aforedescribed with respect to extraction stage 30 and with reference to FIG. 4, it is preferred to pH control this reaction. It is important that the pH in extraction stage 28 be maintained at a value of between about 3.0 and about 4.0.

To obtain such pH control in extraction stage 28, it is preferred to introduce a spent ammoniacal etch into extraction stage 28 via conduit 26. Spent ammoniacal etch is derived from etching copper from printed circuit boards utilized in the electronic industry with an aqueous solution containing ammonia and ammonium chloride. The resultant spent ammoniacal etch will contain copper as $Cu(NH_3)_4CL_2$, for example, in an amount of from 1 to 1½ lbs. copper per gallon of solution. Upon being introduced into extraction stage 28, the copper is selectively extracted from the spent ammoniacal etch upon contacting the hydrogen ion exchange extractant in accordance with the following general reaction (5), wherein R represents the active organic extractant:

$$Cu(NH_3)_4Cl_2 + 2RH \rightarrow R_2Cu + 2NH_4Cl + 2NH_3 \quad (5)$$

In accordance with this reaction, copper is extracted by the active hydrogen ion exchange extractant and ammonium chloride and free ammonia are formed. The ammonia formed during the selective extraction of copper from the spent ammoniacal etch combines with hydrochloric acid formed during the selective extraction of copper from the pregnant stripping solution to form ammonium chloride in accordance with the following general reaction (4):

$$NH_3 + HCl \rightarrow NH_4Cl \quad (4)$$

Extraction stage 28 is equipped with a pH controller to maintain the pH in extraction stage 28 at a value between about 3.0 and about 4.0. Thus, when the pH in extraction stage 28 reaches a predetermined lower limit, spent ammoniacal etch is added to extraction stage 28 via conduit 26. The free ammonia formed in the selective extraction of copper from the spent ammoniacal etch by contact with the hydrogen ion exchange extractant combines with hydrochloric acid to form ammonium chloride. The spent ammoniacal etch is continuously added to extraction stage 28 until the pH reaches a predetermined upper limit at which pont the spent ammoniacal etch flow in conduit 26 is terminated in response to the pH controller. In this manner, the pH is maintained within the selected range to optimize copper extraction from both the spent ammoniacal etch and the pregnant stripping solution in extraction stage 28. Ammonia may be utilized in lieu of spent ammoniacal etch where a sufficient quantity of spent ammoniacal etch to meet the demands of extraction stage 28 is not available. Ammonia may be added via conduit 25 concurrently with the spent ammoniacal etch or added after quantities of the latter have been exhausted. With the active organic extractant employed in a stoichmetric excess, approximately 95 to 99% of the total amount of copper introduced in extraction stage 28 in both the pregnant stripping solution and the spent ammoniacal etch will be extracted.

The aqueous solution emanating from extraction stage 28 via closed loop conduit 40 may be characterized as a weakly acidic aqueous solution containing a relatively small amount of copper, as cupric chloride, this copper being originally present in both the spent ammoniacal etch and the pregnant stripping solution. The aqueous solution is transported via closed loop conduit 40 to a second extraction stage 29 wherein the very weakly acidic solution containing cupric chloride is contacted with the hydrogen ion exchange extractant. Substantially all of the remaining 1 to 5% copper is selectively extracted from the solution by hydrogen ion exchange in accordance with general reaction (1). The spent stripping solution is then recycled via closed loop conduit 40 to stripping stages 44 and 42 respectively. The relatively neutral stripping solution is an aqueous solution which has a pH of about 4 and contains ammonium chloride and only minute amounts of copper (e.g., 5–50 ppm). Thus, the process of the present invention utilizes a relatively neutral stripping solution to strip copper from a loaded extractant in one extraction circuit and a hydrogen ion exchange extractant to selectively extract copper from the pregnant stripping solution in another extraction circuit while concurrently forming more ammonium chloride which is present in the stripping solution. It should be noted that a small amount of active extractant may be entrained in the pregnant stripping solution emanating from stripping stage 42, and thus, may contact the active hydrogen ion exchange extractant in extraction stages 28 and 29. Such cross contamination of active extractants is highly undesirable, and therefore, any suitable means may be employed to remove entrained active extractant from the pregnant stripping solution prior to introducing the latter into extraction stage 28.

A bleed stream is drawn off the recycled stripping solution in conduit 40 and transported via conduit 46 to a suitable mixing tank 48. Ammonia is added to the mixing tank via conduit 49 to form a regenerated ammoniacal etch. This bleed further serves to prevent excessive buildup of ammonium chloride and, therefore, attendant precipitation thereof. Also, an excessive buildup of ammonium chloride adversely affects the stripping efficiency of the stripping solution. To compensate for water loss caused by the bleed, water may be added with ammonia introduced into extraction stage 28 or added to the stripping solution in conduit 40 (not illustrated).

The loaded hydrogen ion exchange extractant emanating from extraction stage 28 is transported via closed loop conduit 50 to wash stage 27 wherein the hydrogen ion exchange extractant is washed with a suitable aqueous solution to dilute the concentration of unwanted impurities, such as chloride ions or unwanted metallic ions (i.e., to maintain the amount of entrained feed in the extractant at a tolerable level for stripping purposes). The resultant loaded hydrogen ion exchange extractant is transported via closed loop conduit 50 to stripping stages 31 and 32 wherein the loaded extractant is contacted with a relatively highly concentrated acidic solution, such as, for example, a sulfuric acid, copper sulfate solution which is countercurrently transported to stripping stages 31 and 32 via closed loop conduit 54. The two stripping stages illustrated are sufficient to strip a substantial portion, for example 90% of the copper loaded in the hydrogen ion exchange extractant therefrom. The stripped hydrogen ion exchange extractant is then transported via closed loop conduit 50 to extraction stages 30, 29 and 28 to selectively extract copper as previously described. The pregnant acidic stripping solution containing copper is passed through a conventional electrowinning unit 56 wherein cathode copper is recovered.

It is extremely important to employ the active extractant in closed loop conduit 15 and the active hydrogen ion exchange extractant in closed loop conduit 50 in excess over the stoichimoetric amount required for selectively extracting copper from various spent etch and process streams as aforedescribed. This excess is needed to ensure that enough active extractant and active hydrogen ion exchange extractant are available to ultimately extract substantially all of the copper from a given feed stream for an extraction circuit.

Figure 5:
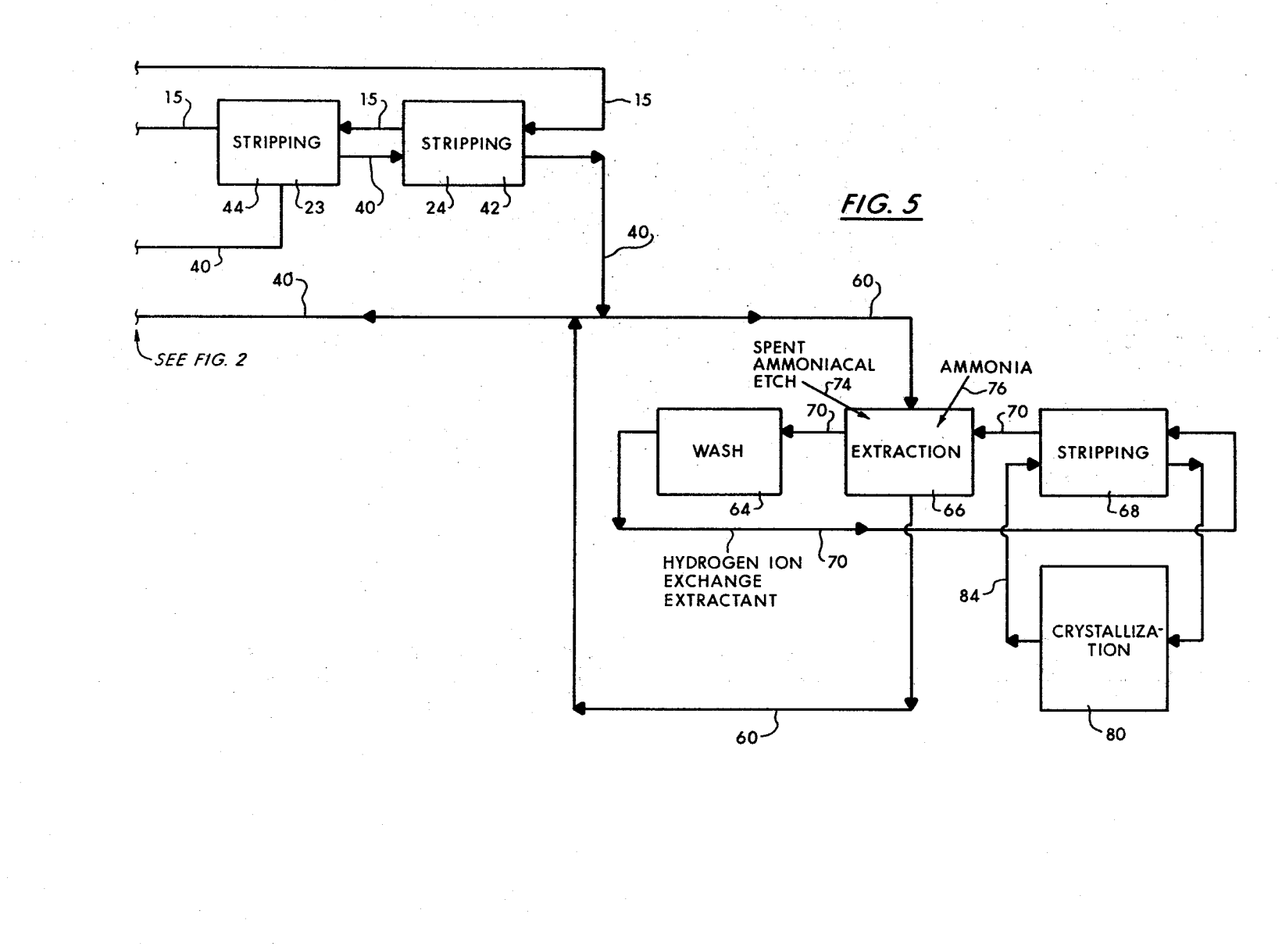
FIG. 5 is a schematic, partial flow diagram of an alternative embodiment of the process of the present invention.

Turning now to FIG. 5, an alternative embodiment of the process of the present invention is illustrated. This embodiment is inclusive of the process described with respect to FIG. 2, and additionally, the alternative embodiment of the process of the present invention illustrated in FIG. 5 includes a circuit for recovery of copper as high purity copper sulfate crystals. Recovering copper as copper sulfate is currently more economical than the recovery of cathode copper. Thus, the alternative embodiment in FIG. 5 provides a process wherein copper may be recovered as copper sulfate and/or as cathode copper, depending on the market demand and/or price.

Specifically, the pregnant stripping solution transported from stripping stage 42 via closed loop conduit 40 is diverted to closed loop conduit 60 and transported to extraction stage 66. In extraction stage 66, the pregnant stripping solution containing copper as cupric chloride is contacted with a second ion exchange extractant transported via conduit 70 to selectively extract copper. The second hydrogen ion exchange extractant utilized in the embodiment of FIG. 4 has an active hydrogen ion exchange extractant constitutent which is dissolved in the inert organic solvent constituent aforedescribed. The active hydrogen ion exchange extractant will selectively extract copper from the pregnant stripping solution by hydrogen ion exchange in accordance with the general reaction (1):

$$CuCl_2 + 2RH \rightarrow R_2Cu + 2HCl \quad (1)$$

It is preferred to utilize a beta diketone, such as LIX 54 manufactured by the Henkel Corporation, as the active hydrogen ion exchange extractant since a weaker acid will effectively strip copper therefrom thereby permitting higher concentrations of copper sulfate to build up in the acidic stripping solution prior to crystallization. LIX 54 will extract copper from an aqueous solution at varying pH in accordance with FIG. 6. As previously discussed with respect to extraction stages 28 and 30 and in accordance with FIG. 6, it is imperative to maintain the pH in extraction stage 66 at a value of between about 4.0 and about 6.0. To obtain such pH control, it is preferred to introduce a spent ammoniacal etch into extraction stage 66 via conduit 74. Copper is selectively extracted from the spent ammoniacal etch by contact with the second hyrogen ion exchange extractant in accordance with the general reaction (5), wherein R represents the active hydrogen ion exchange extractant:

$$Cu(NH_3)_4Cl_2 + 2RH \rightarrow R_2Cu + 2NH_4Cl + 2NH_3 \quad (5)$$

In accordance with this reaction, copper is extracted by the active hyrogen ion exchange extractant and ammonium chloride and free ammonia are formed. The ammonia formed during the selective extraction of copper from the spent ammoniacal etch combines with hydrochloric acid formed during the selective extraction of copper from the pregnant stripping solution to form ammonium chloride in accordance with the general reaction (4):

$$NH_3 + HCl \rightarrow NH_4Cl \quad (4)$$

Extraction stage 66 is equipped with a pH controller to maintain the pH in extraction stage 66 at a value between about 4.0 and about 6.0. Thus, when the pH in extraction stage 66 reaches a predetermined lower limit, spent ammoniacal etch is added to extraction stage 66 via conduit 74. The free ammonia formed in the selective extraction of copper from the ammoniacal etch by contact with the second hydrogen ion exchange extractant combines with the hydrochloric acid to form ammonium chloride. The spent ammoniacal etch is continuously added to extraction stage 66 until the pH reaches a predetermined upper limit at which point the spent ammoniacal etch flow in conduit 74 is terminated in response to the pH controller. In this manner, the pH is maintained within the selected range to optimize copper extraction from both the spent ammoniacal etch and the pregnant stripping solution in extraction stage 66. As previously discussed, ammonia may be utilized in lieu of spent ammoniacal etch where a sufficient quantity of the spent ammoniacal etch to meet the demands of extraction stage 66 is not available. Ammonia may be added in a conduit 76 concurrently with the spent ammoniacal etch or added after quantities of the latter have been exhaused.

As the stripping solution emanating from extraction stage 66 still contains a small amount of copper, for example approximately 0.5 grams per liter, the stripping solution is transported via closed loop conduit 60 to closed loop conduit 40, and via conduit 40 to extraction stages 28 and 29. The remaining copper present in the pregnant stripping solution is substantially entirely extracted by contact with the hydrogen ion exchange extractant in accordance with general reaction (1), as previously set forth. Alternatively, the stripping solution may be recycled to stripping stages 42 and 44 and utilized to strip copper from the loaded extractant until buildup of ammonium chloride therein approaches an excessive level. Then, the stripping solution emanating from extraction stage 66 can be returned via closed loop condui 40 so as to extract copper therefrom in extraction stages 28 and 29 and to remove excessive ammonia chloride via bleed stream 46.

The loaded, second hydrogen ion exchange extractant exits extraction stage 66 via conduit 70 and is transported to wash stage 64 wherein the extractant is washed with a suitable aqueous solution to dilute the concentration of unwanted impurities, such as chloride ions or unwanted metallic ions (i.e., to maintain the amount of feed entrained in the second hydrogen ion exchange extractant at a tolerable level for stripping purposes). The loaded, second hydrogen ion exchange extractant is then transported via conduit 70 to stripping stage 68 wherein the second extractant is contacted with an aqueous acidic stripping solution transported to stage 68 via closed loop conduit 84. The stripping solution selectively strips substantially all of the copper loaded in the second hydrogen ion exchange extractant in accordance with the general reaction (2):

$$H_2SO_4 + R_2Cu \rightarrow 2RH + CuSO_4 \qquad (2)$$

In the instance where a beta diketone is the active extractant in the second hydrogen ion exchange extractant, a weakly acidic solution should be utilized to effectively strip copper from the loaded second extractant. The stripped second extractant is transported via conduit 70 to extraction stage 66. The pregnant stripping solution is conveyed in conduit 84 to a crystallization unit 80 wherein copper sulfate crystals are recovered therefrom. The spent stripping solution emanating from unit 80 is recycled to stripping stage 68. Any conventional crystallization unit may be employed in this process. An electrowinning unit (not illustrated) may be utilized in lieu of crystallization unit 80 to ensure production of cathode copper in the event of a maintenance shut down or malfunction in the circuit employing electro-winning unit 56.

Figure 7:
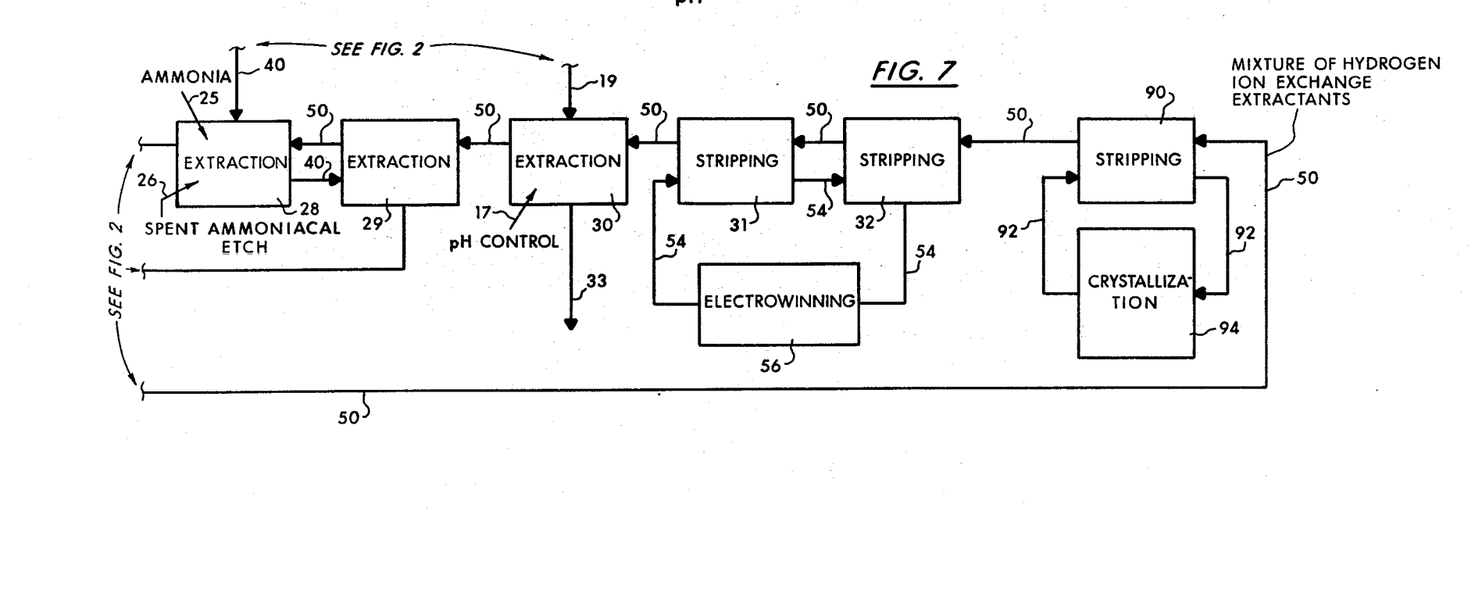
FIG. 7 is a schematic, partial flow diagram of an alternative embodiment of the process of the present invention.

Still another alternative embodiment of the process of the present invention is illustrated in FIG. 7. The process schematic of this embodiment is inclusive of the schematic depicted in FIG. 2, and additionally includes stripping stage 90, closed loop conduit 92 and crystallization unit 94, the function thereof being hereinafter described. The spent cupric chloride etch emanating from extraction stage 22 is transported via conduit 19 to extraction stage 30 wherein the spent etch is contacted with a mixture of two hydrogen ion exchange extractants. The hydrogen ion exchange extractants have an active hydrogen ion exchange extractant constituent dissolved in an inert organic solvent constituent including aliphatic and aromatic solvents, such as, for example, kerosene, naphthols, fuel oil, benzene, toluene and xylene. Each active hydrogen ion exchange extractant may be any such active extractant which will selectively extract copper from the spent cupric chloride etch by hydrogen ion exchange in accordance with the following general reaction (1), wherein R represents the active hydrogen ion exchange extractant:

$$CuCl_2 + 2RH \rightarrow R_2Cu + 2HCl \qquad (1)$$

In addition, one of the active hydrogen ion exchange extractants must be effectively stripped of copper by contact with a relatively highly concentrated acidic solution while the other active extractant must be effectively stripped of copper by contact with a relatively weak acidic solution. As such, it is preferred to utilize a hydroxy oxime, such as LIX 64N, a 5-nonyl 2-hydroxy benzophenoxime, manufactured by the Henkel Corporation, as the active hydrogen ion exchange extractant which can be effectively stripped by a relatively strong acidic solution, and a beta diketone, such as LIX 54 manufactured by the Henkel Corporation, as the active hydrogen ion exchange extractant which can be effectively stripped with a relatively weak acidic solution. Extraction stage 30 is pH controlled by the addition of a suitable basic neutralizing reagent in the manner previously described, so that substantially all of the copper present in the cupric chloride etch can be extracted therefrom. However, the pH in extraction stage 30 may be maintained at a pH of between about 4.0 and about 6.0 since at a pH above about 4.0 copper present in the aqueous phase will not begin to precipitate out of solution because the two active hydrogen ion exchange extractants will have extracted substantially all the copper initially present in the aqueous phase.

The pregnant stripping solution containing copper as cupric chloride emanating from stripping stage 42 is contacted in extraction stages 28 and 29 respectively with the mixture of two hydrogen ion exchange extractants countercurrently transported to extraction stages 28 and 29 via closed loop conduit 50. The two hydrogen ion exchange extractants selectively extract copper from the pregnant stripping solution by hydrogen ion exchange in accordance with general reaction (1), previously set forth. As previously discussed with respect to FIG. 2, extraction stage 28 must be pH controlled to ensure efficient extraction of copper. It is preferred that the pH in extraction stage 28 be maintained at a value of between about 4.0 and about 6.0. In this regard, it is important to note that a pH above about 4.0 utilizing the preferred mixture of a hydroxy oxime and a beta diketone will not result in precipitation of copper hydroxide from the aqeous phase in extraction stage 28 (as previously discussed with respect to hydroxy oxime active extractants). Utilizing such mixture, the beta diketone will extract copper at pH values of between about 4.0 and about 6.0 thereby preventing any copper hydroxide precipitation. As previously discussed, it is preferred to obtain such pH range by introducing a spent ammoniacal etch into extraction stage 28 via conduit 26 in response to a pH controller. As before, ammonia may be utilized to augment insufficient quantities of spent ammoniacal etch.

The weakly acidic aqueous solution, which contains a relatively small amount of copper, as cupric chloride, emanating from extraction stage 28, is transported via conduit 40 to second extraction stage 29 and contacted therein with the mixture of two hydrogen ion exchange extractants. Substantially all of the copper remaining in the solution is extracted by the mixture in accordance with general reaction (1). The spent stripping solution is then recycled via closed loop conduit 40 as the relatively neutral stripping solution utilized in stripping stages 44 and 42 in the manner previously described.

The loaded mixture of hydrogen ion exchange extractants is transported via closed loop conduit 50 to wash stage 27 (not illustrated) wherein the mixture is washed, as previously described, and then to stripping stage 90 wherein the mixture is contacted with a weakly acidic solution transported to stage 90 via closed loop conduit 92. The weakly acidic stripping solution strips a substantial portion of the copper loaded in the beta diketone extractant while concurrently extracting an extremely small amount of the copper loaded on the hydroxy oxime extractant. The resultant pregnant weakly acidic stripping solution is transported to a conventional crystallization unit 94 wherein copper sulfate crystals are recovered. The partially stripped mixture of extractants is transported via closed loop conduit 50 to stripping stages 31 and 32 and contacted therein with a relatively strong acidic solution transported via conduit 54 which effectively strips a substantial portion of the copper loaded on the hydroxy oxime extractant and the copper remaining in the beta diketone extractant. The pregnant strong acidic solution is then transported via closed loop conduit 54 to a conventional electrowinning unit 56 wherein cathode copper is recovered. The stripped mixture of extractants is transported to extraction stage 30.

Thus, by utilizing the embodiment of FIG. 7, diversity of final product, i.e., both cathode copper and copper sulfate, can be achieved utilizing the mixture of two active hydrogen ion exchange extractants in a single extraction circuit. The relative quantity of each copper product recovered may be dictated by the relative proportions of the active extractants employed in the mixture, e.g., the more beta diketone present in the mixture, the more copper sulfate recovered. As before, a stoichiometric excess of both active extractants should be employed in the mixture to ensure ultimate extraction of substantially all of the copper present in a given feed stream.

Thus, it can be appreciated that the embodiments of the present invention illustrated in FIGS. 2, 5 and 7 provide a process for selectively extracting copper from two separate and distinct feed streams. Further, although the feed streams are described as spent etch solutions derived from etching printed circuit boards utilized in the electronic industry, the process of the present invention is not intended to be limited in application to copper-containing spent etch solutions, but is inclusive of similar copper-containing solutions, irrespective of the origin thereof. The process provided by the embodiments illustrated in FIGS. 2, 5 and 7 further provide for product selectivity as copper may be electrowon as cathode copper and/or crystallized as copper sulfate as the final product of the process. Such selectivity ensures the acceptance of the process of the present invention in most marketplaces.

As evident to the skilled artisan, the number of extraction, stripping or wash stages utilized in the process of the present invention will vary depending upon, inter alia, the feed stream concentrations, the active extractants employed, the stripping solutions utilized and the degree of extraction, stripping and washing desired. Thus, although a certain number of extraction, stripping and washing stages are illustrated for the embodiments of FIGS. 2, 5 and 7 the number of stages will usually vary where process parameters differ.

The following examples are illustrative of the application of the process of the present invention and are not to be construed as limiting the scope thereof.

EXAMPLE I

A spent cupric chloride etch containing 160 g/liter Cu and 298 g/liter Cl was fed at a rate of 2.7 ml/min to a countercurrent, multistage extraction unit wherein the spent etch was contacted with a tertiary amine extractant fed at a rate of 54 ml/min, the extractant having a constituency of 20 vol.% ALAMINE 336, 10 vol.% isodecanol and 70 vol.% kerosene solvent. The extraction unit consisted of 3 mixer-settler units manufactured by Bell Engineering. Each mixer-settler unit included a square mixer compartment having an 180 cc volume and equipped with a mixer turbine, being 1″ diameter, with six grooved vanes, and a rotational speed of 1800 rpm (adjustable). Each settler compartment was dimensioned $3\frac{1}{2}''$ by $4\frac{3}{4}''$. Incoming or advance solutions were pumped by adjustable Blue-White Industry diaphram pumps, while intra-stage pumping was accomplished by means of the mixer turbines. The extraction was carried out with an advance "organic phase/aqueous phase" ration (O/A) of 20.

The loaded tertiary amine extractant was contacted in a countercurrent, multistage stripping unit consisting of two mixer-settler units, as just described, with an aqueous solution having a flow rate of 50 ml/min and a pH of 2.5 and containing 250 g/liter $NH_4Cl$ and 0 g/liter Cu. The stripping was performed at an advance O/A ratio of 1.0. Both the aforedescribed extraction and stripping operations were carried out at ambient temperature.

The pregnant aqueous stripping solution containing 8 g/liter Cu was transported to an extraction unit consisting of one aforedescribed mixer-settler unit, and contacted therein at 35° C. with hydrogen ion exchange extractant, containing 100 vol.% LIX 54, introduced at a flow rate of 50 ml/min. The extraction unit was equipped with a Chemtrix "Hi-Lo" set pH controller and 150 g/liter Cu as $Cu(NH_3)_4Cl_2$ was added to the extraction unit in response to the pH controller to control the extraction pH at approximately 3.5.

The loaded LIX 54 extractant was stripped at 50° C. and an advance O/A ration of 4.35 with a stripping solution containing 108 g/liter $H_2SO_4$ and 60 g/liter Cu with an advance O/A ratio of 4.35 in a stripping unit consisting of one aforedescribed mixer-settler unit. The pregnant stripping solution containing 120 g/liter Cu and 15 g/liter $H_2SO_4$ was conveyed from the stripping unit at a rate of 11 to 12 ml/min, the copper being recovered therefrom as $CuSO_4$ by crystallization. The stripped LIX 54 extractant was recycled to the extraction unit.

The pregnant aqueous stripping solution emanating from the LIX 54 extraction unit contained approximately 0.5 g/liter Cu. This pregnant solution was transported to an extraction unit consisting of one aforedescribed mixer-settler unit, and contacted therein at 25° C. with a hydrogen ion exchange extractant containing 35 vol.% LIX 64 N and 65 vol.% kerosene, the extractant introduced at a flow rate of 50 ml/min.

The loaded LIX 64 N extractant was stripped at ambient temperature and an advance O/A ratio of 33 with a stripping solution having a flow rate of 1 to 2 ml/min and containing 30 g/liter Cu and 150 g/liter $H_2SO_4$. The stripping operation is performed in a stripping unit consisting of one aforedescribed mixer-settler unit. The pregnant stripping solution was conveyed from the stripping unit containing 45 g/liter Cu and 127 g/liter $H_2SO_4$, the copper being recoverable as cathode copper by electrowinning. The stripped LIX 64 N extractant was recycled to the extraction unit.

The spent stripping solution emanating from the LIX 64 N extraction unit containing 250 g/liter NH$_4$Cl and 0 g/liter Cu at a pH of 2.5 was recycled to the tertiary amine stripping unit at a rate of 50 ml/min. A bleed was drawn off the recycled spent stripping solution at a rate of approximately 2 ml/min. to prevent excessive buildup of NH$_4$Cl.

A retention time of 2 minutes was utilized in the mixing compartments of all mixer-settler units. An internal mixing O/A ratio was 1.0, with internal recycle being employed where necessary.

EXAMPLE II

A spent cupric chloride etch is fed at a rate of 2.5 gal/min to a countercurrent, three stage extraction unit wherein the spent etch is contacted with a tertiary amine extractant at a flow rate of 50 gal/min the extractant having a constituency of 20 vol.% ALAMINE 336, 10 vol.% isodecanol and 70 vol.% kerosene solvent. Each stage consists of a conventional mixer-settler device having separate mixing and settling compartments. The aqueous raffinate from this extraction unit is transported to an extraction unit consisting of one mixer-settler device wherein the raffinate is contacted with an organic extractant, 40 vol.% LIX 64 N dissolved in 60 vol.% kerosene, at a flow rate of 50 gal/min to extract the remaining copper therefrom. This extraction stage is pH controlled by adding sodium carbonate thereto. The resultant aqueous raffinate is transported to an evaporation pond to recover sodium chloride therefrom.

The loaded tertiary amine extractant is contacted in a countercurrent stripping unit consisting of two mixer-settler devices with an aqueous solution to strip copper therefrom. The resultant pregnant aqueous stripping solution is transported to an extraction unit consisting of one mixer-settler device, and is contacted therein with a hydrogen ion exchange extractant, containing 50 vol.% LIX 54 and 50 vol.% kerosene, introduced at a flow rate of 50 gal/min. The extraction unit is equipped with a conventional pH controller and spent ammoniacal etch (or ammonia where the quantity of spent ammoniacal etch is insufficient) is added to the extraction unit in response to the pH controller to maintain the extraction pH at approximately 3.5. The loaded LIX 54 extractant is washed in a washing stage consisting of one mixer-settler device with water at a flow rate of approximately 0.2 to 0.5 gal/min, is transported to a conventional surge tank and then, is stripped at 50° C. with an aqueous, acidic stripping solution in a stripping unit consisting of one mixer-settler device. The pregnant stripping solution containing 120 g/l copper is transported to a crystallization unit, the copper being recovered therefrom as CuSO$_4$ by crystallization. The stripped LIX 54 extractant is recycled to the extraction unit.

The stripping solution emanating from this extraction stage which still contains some quantity of copper, for example 0.5 g/l, is transported to an extraction unit consisting of two mixer-settler devices, and contacted therein with the hydrogen ion exchange extractant utilized to contact the aqueous raffinate emanating from the tertiary amine extraction unit, containing 40 vol.% LIX 64 N and 60 vol.% kerosene, the extractant being introduced at a flow rate of 50 gal/min. The first mixer-settler device is equipped with a conventional pH controller and spent ammoniacal etch (and/or ammonia where the quantity of spent ammoniacal etch is insufficient) is added to the first mixer-settler device in response to the pH controller to maintain the extraction pH at approximately 3.5. After passing through the second mixer-settler device, the spent stripping solution is transported to a conventional surge tank and then is recycled to the tertiary amine stripping stage. A bleed is drawn off this recycled stream, and either ammoniacal etch is regenerated therefrom or ammonium chloride is crystallized therefrom.

The loaded LIX 64 N extractant is washed in one mixer-settler device with water from the LIX 54 wash stage. The loaded LIX 64 N extractant is passed through a conventional surge tank to a stripping unit consisting of two mixer-settler devices wherein the extractant is contacted with an aqueous stripping solution containing 30 g/l copper and 150 g/l H$_2$SO$_4$. The stripping solution emanating from this stripping unit contains 45 g/l copper and 127 g/l H$_2$SO$_4$ and is transported to a conventional electrowinning unit wherein cathode copper is recovered. The stripped LIX 64 N extractant is recycled back to the extraction stages aforedescribed.

Utilizing the process as described in Example II should result in the recovery of 10 tons per day of CuSO$_4$.5H$_2$O and 15 lbs cathode copper per day.

It should be noted that a modifier may be added to the tertiary amine extractant employed in the present invention to improve phase separation and increase the metal solubility of the active organic extractant.

Thus, the present invention as illustrated in the embodiments of FIGS. 2, 5 and 7 provides a process for selectively extracting copper from two distinct and diverse copper feed streams. One of these copper feeds serves to pH control the extraction of copper from both of the feed streams thereby economically and effectively utilizing capabilities of hydrogen ion exchange extractants employed in the process. The process further provides diversified copper product, saleable by-products and a regenerated ammoniacal etch solution.

While various embodiments and modifications of this invention have been described in the foregoing description, further modifications will be apparent to those skilled in the art. Such modifications are included within the scope of this invention as defined by the following claims.

I claim:

1. A process for selectively recovering copper from an acidic chloride solution containing copper, comprising:

contacting said acidic chloride solution containing copper with an extractant, said extraction selectively extracting copper as copper chloride from said acidic solution;

contacting said extractant containing copper extracted from said acidic chloride solution with an aqueous solution to strip copper from said extractant thereby forming an aqueous solution pregnant with copper;

contacting said pregnant aqueous solution with a hydrogen ion exchange extractant, said hydrogen ion exchange extractant selectively extracting copper from said pregnant aqueous solution; and contacting said hydrogen ion exchange extractant containing copper with an aqueous acid solution to strip copper from said hydrogen ion exchange extractant thereby forming an aqueous acidic solution pregnant with copper, saleable copper being recoverable from said pregnant aqueous acidic solution.

2. The process of claim 1 wherein said extractant is comprised of a tertiary amine having the formula:

wherein $R_1$, $R_2$ and $R_3$ are straight or branched aliphatic chains containing from 6 to 18 carbon atoms, said tertiary amine being dissolved in an inert organic solvent carrier.

3. The process of claim 2 wherein $R_1$, $R_2$ and $R_3$ are straight or branched aliphatic chains containing from 8 to 10 carbon atoms and said inert organic solvent carrier is kerosene.

4. The process of claim 1 wherein said hydrogen ion exchange extractant comprises an active hydrogen ion exchange extractant selectively extracting copper from said pregnant aqueous solution, said active hydrogen ion exchange extractant being dissolved in an inert organic solvent carrier.

5. The process of claim 4 wherein said active hydrogen ion exchange extractant is a hydroxy oxime and said carrier is kerosene.

6. The process of claim 5 further comprising:
electrowinning copper as cathode copper from said pregnant aqueous acidic solution.

7. The process of claim 4 wherein said active hydrogen ion exchange extractant is a beta diketone and said carrier is kerosene.

8. The process of claim 7 further comprising:
crystallizing copper sulfate from said pregnant aqueous acidic solution.

9. The process of claim 1 further comprising:
contacting a copper-containing source with said acid chloride solution from which copper has been extracted to leach copper from said source thereby forming said acidic chloride solution containing copper.

10. The process of claim 9 further comprising:
bleeding said acidic chloride solution from which copper has been extracted prior to contacting said source to remove contaminants and prevent precipitation from said acidic chloride solution.

11. A process for selectively recovering copper from an acidic chloride solution containing copper, comprising:
contacting said acidic chloride solution containing copper with an extractant, said extractant selectively extracting copper as copper chloride from said acidic chloride solution;
contacting said acidic chloride solution from which copper has been selectively extracted by said extractant with a hydrogen ion exchange extractant, said hydrogen ion exchange extractant selectively extracting substantially all copper remaining in said acidic chloride solution;
contacting said extractant containing copper extracted from said acidic chloride solution as copper chloride with a relatively neutral aqueous stripping solution to strip copper from said extractant thereby forming an aqueous stripping solution pregnant with copper;
contacting said aqueous stripping solution pregnant with copper with said hydrogen ion exchange extractant, said hydrogen ion exchange extractant selectively extracting copper from said aqueous stripping solution pregnant with copper; and
contacting said hydrogen ion exchange extractant containing copper extracted from said acidic chloride solution and said pregnant aqueous stripping solution with an aqueous acidic stripping solution to strip copper from said hydrogen ion exchange extractant thereby forming an aqueous acidic stripping solution pregnant with copper, saleable copper being recoverable from said pregnant aqueous acidic stripping solution.

12. The process of claim 11 wherein hydrochloric acid is formed by the selective extraction of copper from said pregnant aqueous stripping solution by said hydrogen ion exchange extractant, said process further comprising:
adding a base to neutralize said hydrochloric acid thereby maintaining the pH during contacting said aqueous stripping solution pregnant with copper with said hydrogen ion exchange extractant within a predetermined range to permit extraction of substantially all of said copper contained in said pregnant aqueous stripping solution.

13. The process of claim 12 wherein said predetermined pH range is between about 3.0 to about 4.0.

14. The process of claim 12 wherein said aqueous stripping solution from which substantially all of said copper has been extracted by contact with said hydrogen ion exchange extractant is said relatively neutral aqueous stripping solution.

15. The process of claim 13 wherein said base is ammonia.

16. The process of claim 13 further comprising:
concurrently contacting a spent ammoniacal etch containing copper as $Cu(NH_3)_4Cl_2$ with said hydrogen ion exchange extractant while contacting said pregnant aqueous stripping solution with said hydrogen ion exchange extractant, said hydrogen ion exchange extractant selectively extracting copper from said ammoniacal etch with ammonia and ammonium chloride being formed by said extraction, said ammonia serving as said base.

17. The process of claim 14 wherein said aqueous stripping solution from which substantially all of said copper has been extracted contains ammonium chloride, said process further comprising:
bleeding a portion of said aqueous stripping solution from which substantially all of said copper has been extracted so as to prevent precipitation of ammonium chloride prior to contact with said extractant containing copper as copper chloride.

18. The process of claim 17 further comprising:
adding ammonium to said portion to form an ammoniacal etch solution.

19. The process of claim 11 wherein a portion of said extractant containing copper as copper chloride becomes entrained in said relatively neutral aqueous stripping solution upon contact therewith, the process further comprising:
removing said entrained portion of said extractant from said aqueous stripping solution pregnant with copper prior to contacting said hydrogen ion exchange extractant.

20. The process of claim 11 wherein said acidic chloride solution is a spent cupric chloride etch containing copper as cupric chloride, said etch being derived by etching copper from printed electronic circuit boards.

21. The process of claim 11 wherein said extractant is comprised of a tertiary amine having the formula:

wherein $R_1$, $R_2$, and $R_3$ are straight or branched aliphatic chains containing from 6 to 18 carbon atoms, said tertiary amine being dissolved in an inert organic solvent carrier.

22. The process of claim 21 wherein $R_1$, $R_2$ and $R_3$ are straight or branched aliphatic chains containing from 8 to 10 carbon atoms and said inert organic solvent carrier is kerosene.

23. The process of claim 11 wherein said hydrogen ion exchange extractant comprises an active hydrogen ion exchange extractant selectively extracting copper from said pregnant aqueous solution, said active hydrogen ion exchange extractant being dissolved in an inert organic solvent carrier.

24. The process of claim 23 wherein said active hydrogen ion exchange extractant is a hydroxy oxime and said carrier is kerosene.

25. The process of claim 24 further comprising:
electrowinning copper as cathode copper from said pregnant aqueous acidic stripping solution.

26. The process of claim 11 wherein hydrochloric acid is formed by the selective extraction of copper from said acidic chloride solution by said hydrogen ion exchange extractant, said process further comprising:
adding a base to neutralize said hydrochloric acid thereby maintaining the pH during contacting said acidic chloride solution from which copper has been selectively extracted by said extractant with said hydrogen ion exchange extractant within a predetermined range to permit extraction of substantially all of said copper remaining in said acidic chloride solution.

27. The process of claim 26 wherein said predetermined pH range is between about 3.0 and about 4.0.

28. The process of claim 27 wherein said base is sodium carbonate.

29. The process of claim 28 further comprising:
transporting said acidic chloride solution from which substantially all of said copper has been extracted to a solar evaporation pond to recover sodium chloride.

30. The process of claim 11 further comprising:
contacting said hydrogen ion exchange extractant containing copper extracted from said acidic chloride solution and said pregnant aqueous stripping solution with water to dilute the concentration of impurities contained in said hydrogen ion exchange extractant containing copper prior to contacting said aqueous acidic stripping solution.

31. A process for selectively recovering copper from an acidic chloride solution containing copper, comprising:
contacting said acidic chloride solution containing copper with an extractant, said extractant selectively extracting copper as copper chloride from said acidic chloride solution;
contacting said acidic chloride solution from which copper has been selectively extracted by said extractant with a hydrogen ion exchange extractant, said hydrogen ion exchange extractant selectively extracting substantially all copper remaining in said acidic chloride solution;
contacting said extractant containing copper extracted from said acidic chloride solution as copper chloride with a relatively neutral aqueous stripping solution to strip copper from said extractant thereby forming an aqueous stripping solution pregnant with copper;
contacting said aqueous stripping solution pregnant with copper with a second hydrogen ion exchange extractant, said second hydrogen ion exchange extractant selectively extracting copper from said aqueous stripping solution pregnant with copper;
contacting said hydrogen ion exchange extractant containing copper extracted from said acidic chloride solution with an aqueous acidic stripping solution to strip copper from said hydrogen ion exchange extractant thereby forming an aqueous acidic stripping solution pregnant with copper, saleable copper being recoverable from said pregnant aqueous acidic stripping solution; and
contacting said second hydrogen ion exchange extractant containing copper extracted from said pregnant aqueous stripping solution with a second aqueous acidic stripping solution to strip copper from said second hydrogen ion exchange extractant thereby forming a second aqueous acidic stripping solution pregnant with copper, saleable copper being recoverable from said second pregnant aqueous acidic stripping solution.

32. The process of claim 31 wherein hydrochloric acid is formed by the selective extraction of copper from said pregnant aqueous stripping solution by said second hydrogen ion exchange extractant, said process further comprising:
adding a base to neutralize said hydrochloric acid thereby maintaining the pH during contacting said aqueous stripping solution pregnant with copper with said second hydrogen ion exchange extractant within a predetermined range to permit extraction of substantially all of said copper contained in said pregnant aqueous stripping solution.

33. The process of claim 32 wherein said predetermined pH range is between about 4.0 to about 6.0.

34. The process of claim 33 wherein said base is ammonia.

35. The process of claim 33 further comprising:
concurrently contacting a spent ammoniacal etch containing copper as $Cu(NH_3)_4Cl_2$ with said second hydrogen ion exchange extractant while contacting said pregnant aqueous stripping solution with said second hydrogen ion exchange extractant, said second hydrogen ion exchange extractant selectively extracting copper from said ammoniacal etch with ammonia and ammonium chloride being formed by said extraction, said ammonia serving as said base.

36. The process of claim 31 wherein a portion of said extractant becomes entrained in said relatively neutral aqueous stripping solution upon contact therewith, the process further comprising:
removing said entrained portion of said extractant from said aqueous stripping solution pregnant with copper prior to contacting said second hydrogen ion exchange extractant.

37. The process of claim 31 wherein said acidic chloride solution is a spent cupric chloride etch containing copper as cupric chloride, said etch being derived by etching copper from printed electronic circuit boards.

38. The process of claim 31 wherein said extractant is comprised of a tertiary amine having the formula:

wherein $R_1$, $R_2$, and $R_3$ are straight or branched aliphatic chains containing from 6 to 18 carbon atoms, said tertiary amine being dissolved in an inert organic solvent carrier.

39. The process of claim 31 wherein $R_1$, $R_2$ and $R_3$ are straight or branched aliphatic chains containing from 8 to 10 carbon atoms and said inert organic solvent carrier is kerosene.

40. The process of claim 31 wherein said second hydrogen ion exchange extractant comprises an active hydrogen ion exchange extractant for selectively extracting copper from said pregnant aqueous solution, said active hydrogen ion exchange extractant being dissolved in an inert organic solvent carrier.

41. The process of claim 40 wherein said active hydrogen ion exchange extractant is a beta diketone and said carrier is kerosene.

42. The process of claim 41 further comprising:
crystallizing copper sulfate from said second pregnant aqueous acidic stripping solution.

43. The process of claim 41 further comprising:
electrowinning copper as cathode copper from said second pregnant aqueous acidic stripping solution.

44. The process of claim 31 further comprising:
contacting said second hydrogen ion exchange extractant containing copper extracted from said pregnant aqueous stripping solution with water to dilute the concentration of impurities contained in said second hydrogen ion exchange extractant prior to contacting said second aqueous acidic stripping solution.

45. The process of claim 31 further comprising:
contacting said pregnant aqueous stripping solution from which copper has been extracted by said second hydrogen ion exchange extractant with said hydrogen ion exchange extractant, said hydrogen ion exchange extractant selectively extracting substantially all of the copper remaining in said pregnant aqueous stripping solution.

46. The process of claim 32 wherein said pregnant aqueous stripping solution from which copper has been extracted by said second hydrogen ion exchange extractant is said relatively neutral stripping solution.

47. A process for selectively recovering copper from an acidic chloride solution containing copper, comprising:
contacting said acidic chloride solution containing copper with an extractant, said extractant selectively extracting copper as copper chloride from said acidic chloride solution;
contacting said acidic chloride solution from which copper has been selectively extracted by said extractant with a mixture of a first hydrogen ion exchange extractant and a second hydrogen ion exchange extractant, said mixture selectively extracting substantially all copper remaining in said acidic chloride solution;
contacting said extractant containing copper extracted from said acidic chloride solution as copper chloride with a relatively neutral aqueous stripping solution to strip copper from said extractant thereby forming an aqueous stripping solution pregnant with copper;
contacting said aqueous stripping solution pregnant with copper with said mixture, said mixture selectively extracting copper from said aqueous stripping solution pregnant with copper;
contacting said mixture containing copper extracted from said acidic chloride solution and said pregnant aqueous stripping solution with a first aqueous acidic stripping solution to strip copper from said first hydrogen ion exchange extractant of said mixture thereby forming a first aqueous acidic stripping solution pregnant with copper, saleable copper being recoverable from said first pregnant aqueous acidic stripping solution; and
contacting said mixture containing copper extracted from said acidic chloride solution and said pregnant aqueous stripping solution with a second aqueous acidic stripping solution to strip copper from said second hydrogen ion exchange extractant of said mixture thereby forming a second aqueous acidic stripping solution pregnant with copper, saleable copper being recoverable from said second pregnant aqueous acidic stripping solution.

48. The process of claim 47 wherein hydrochloric acid is formed by the selective extraction of copper from said pregnant aqueous stripping solution by said mixture, said process further comprising:
adding a base to neutralize said hydrochloric acid thereby maintaining the pH during contacting said aqueous stripping solution pregnant with copper with said mixture within a predetermined range to permit extraction of substantially all of said copper contained in said aqueous stripping solution.

49. The process of claim 48 wherein said predetermined pH range is between about 4.0 to about 6.0.

50. The process of claim 49 wherein said base is ammonia.

51. The process of claim 49 further comprising:
concurrently contacting a spent ammoniacal etch containing copper as $Cu(NH_3)_4Cl_2$ with said mixture while contacting said pregnant aqueous stripping solution with said mixture, said mixture selectively extracting copper from said ammoniacal etch with ammonia and ammonium chloride being formed by said extraction, said ammonia serving as said base.

52. The process of claim 47 wherein a portion of said extractant becomes entrained in said relatively neutral aqueous stripping solution upon contact therewith, the process further comprising:
removing said entrained portion of said extractant from said aqueous stripping solution pregnant with copper prior to contacting said mixture.

53. The process of claim 47 wherein said acidic chloride solution is a spent cupric chloride etch containing copper as cupric chloride, said etch being derived by etching copper from printed electronic circuit boards.

54. The process of claim 47 wherein said extractant is comprised of a tertiary amine having the formula:

wherein $R_1$, $R_2$, and $R_3$ are straight or branched aliphatic chains containing from 6 to 18 carbon atoms, said tertiary amine being dissolved in an inert organic solvent carrier.

55. The process of claim 47 wherein $R_1$, $R_2$ and $R_2$ are straight or branched aliphatic chains containing from 8 to 10 carbon atoms and said inert organic solvent carrier is kerosene.

56. The process of claim 47 further comprising:
contacting said mixture containing copper extracted from said pregnant aqueous stripping solution with water to dilute the concentration of impurities contained in said mixture prior to contacting said first and second aqueous acidic stripping solutions.

57. The process of claim 47 wherein said first hydrogen ion exchange extractant comprises an active hydrogen ion exchange extractant for selectively extracting copper from said pregnant aqueous solution, said active hydrogen ion exchange extractant being dissolved in an inert organic solvent carrier.

58. The process of claim 57 wherein said active hydrogen ion exchange extractant is a hydroxy oxime and said carrier is kerosene.

59. The process of claim 58 wherein said first aqueous acidic stripping solution is a relatively strong aqueous acidic solution, said process further comprising:
electrowinning copper as cathode copper from said first pregnant aqueous acidic stripping solution.

60. The process of claim 57 wherein said second hydrogen ion exchange extractant comprises an active hydrogen ion exchange extractant for selectively extracting copper from said pregnant aqueous solution, said active hydrogen ion exchange extractant being dissolved in an inert organic solvent carrier.

61. The process of claim 60 wherein said active hydrogen ion exchange extractant of said second extractant is a beta diketone and said carrier is kerosene.

62. The process of claim 61 wherein said second aqueous acidic stripping solution is a weakly acidic solution, said process further comprising:
crystallizing copper sulfate from said second pregnant aqueous acidic stripping solution.

* * * * *